Nov. 27, 1951     C. E. ENGLE     2,576,505
MILK CAN PUNCH
Filed Feb. 13, 1948
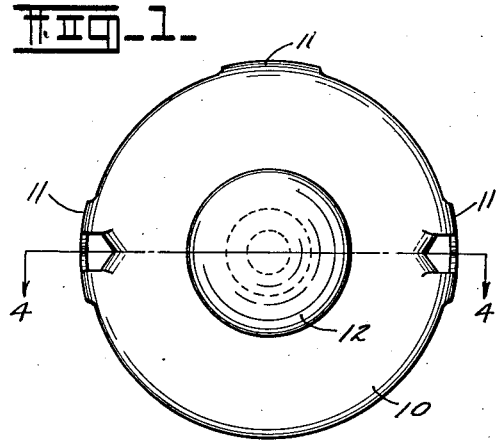
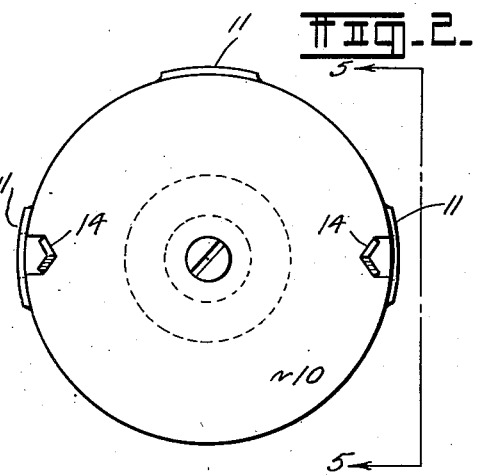
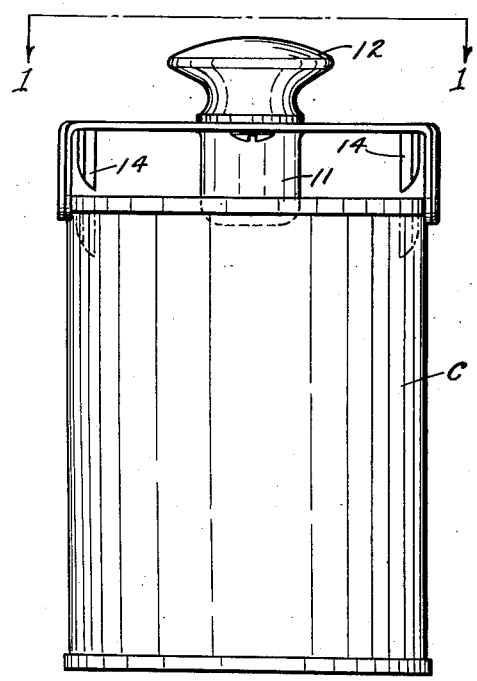
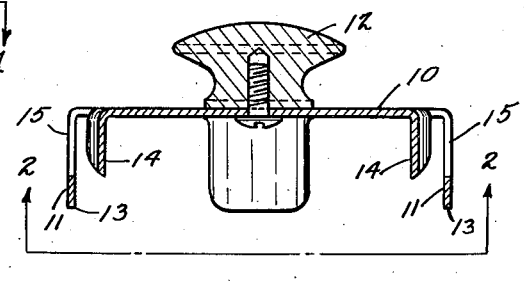
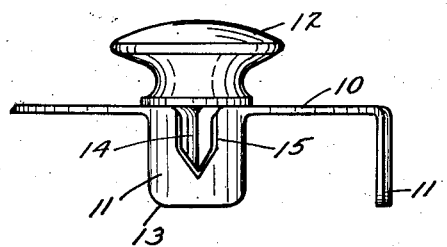
INVENTOR.
Charles E. Engle.
BY
ATTORNEY.

Patented Nov. 27, 1951

2,576,505

UNITED STATES PATENT OFFICE 2,576,505

MILK CAN PUNCH

Charles E. Engle, Warren, Ohio

Application February 13, 1948, Serial No. 8,151

2 Claims. (Cl. 30—6.1)

This invention relates to can openers generally and more particularly to a device for punching oppositely disposed openings in condensed milk cans.

The principal object of the invention is the provision of a device for punching openings in milk cans.

A further object of the invention is the provision of a milk can punch including punch means and guard members disposed adjacent thereto.

A still further object of the invention is the provision of a milk can punch comprising an integrally formed structure including a main frame member, a plurality of depending guards and a plurality of punch members positioned adjacent the said guards.

A still further object of the invention is the provision of an inexpensive form of milk can punch.

The milk can punch shown and described herein has been designed to form a simple, inexpensive and efficient device for punching oppositely disposed openings in the top of a condensed milk can. It is well known that many hundreds of thousands of condensed milk cans are sold each year and that each can must be opened for use by some means and that can openers, ice picks and other pointed instruments are generally employed for the purpose with the result that injuries frequently occur to the person attempting to open the can.

The present invention contemplates the provision of a device which will enable milk cans to be easily and safely opened without any danger of injury in handling the opening tool either before the actual opening of the milk can or afterwards.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of the milk can punch.

Figure 2 is a bottom view of the milk can punch.

Figure 3 is a side elevation of the milk can punch showing the same in position on top of a condensed milk can.

Figure 4 is a side view of the milk can punch. Line 2—2 on Figure 4 shows the section of Figure 2.

Figure 5 is a side view of the milk can punch taken on line 5—5 of Figure 2.

By referring to the drawings and Figures 1, 2, 4 and 5 in particular it will be seen that a milk can punch has been disclosed which comprises a circular frame 10 having a plurality of circumferentially spaced, depending guard members 11—11 positioned thereon and a raised handle 12 fixed thereto and centrally thereof. Each of the plurality of circumferentially spaced guard members 11—11 forms, in effect, a depending leg, the lower portions of which are rounded as indicated by the numerals 13.

By referring to Figures 4 and 5 of the drawings it will be observed that a pair of the guard members 11—11 are positioned in oppositely disposed relation to one another and that a pair of oppositely disposed punches 14—14 are formed adjacent thereto and largely of the stock of the guard members 11—11 thereby forming vertically extending slots 15—15 in the oppositely disposed guard members 11—11. The punches 14—14 are blanked and formed so that they form, in effect, prongs depending from the frame 10 and spaced slightly inwardly with respect to the oppositely disposed guard members 11—11. This formation of the punches 14—14 provides an unusually sturdy construction in that the material of the disc-like frame 10 is not cut away adjacent the punches 14—14 as the stock for their formation is taken primarily from the depending guard members 11—11.

It will be observed by referring to Figures 1 and 2 of the drawings that the punches 14—14 are formed in a cross sectional V shape so as to insure their rigidity and their lowermost ends V-shaped and sharpened so that they readily punch the top of a condensed milk can such as shown in Figure 3 of the drawings and indicated by the letter C.

In utilizing the milk can punch shown and described herein it may be conveniently placed on the top of a milk can, as shown in Figure 3 of the drawings, and correctly lined up with the punches 14—14 in oppositely disposed relation by reason of the guiding action of the third guard member 11 which is located midway on the periphery of the disc-like frame 10 with respect to the punches 14—14 and the slotted guard members 11—11 positioned adjacent thereto. When the milk can punch is located on top of a milk can, as shown in Figure 3 of the drawings, pressure brought to bear on the handle 12 will readily move the punches 14—14 through the metal of the can C and form suitable openings therein.

It will be observed that when the milk can punch is removed from the milk can C and placed on any other support, the punches 14—14 are protected from accidental engagement therewith by reason of the adjacently positioned, slotted guard members 11—11 which are longer than the punches 14—14 and positioned so closely thereto as to make it unlikely that any accidental engagement with the punches 14—14 occur. It will thus be seen that a milk can punch meeting the several objects of the invention has been disclosed in that it may be economically made by a simple blanking and forming operation and the subsequent attachment of the handle 12 to the shape thus formed. The device may be plated, painted or otherwise finished as desired and may obviously be produced inexpensively by reason of its simplicity of construction.

Having thus described my invention, what I claim is:

1. A milk can punch including a disc-like frame having three guard members depending from the peripheral edge thereof and circumferentially spaced with respect to one another, two of said guard members lying in oppositely disposed relation to one another and portions of the said oppositely disposed guard members being cut away therefrom and bent inwardly and downwardly with respect thereto and pointed to form punch members.

2. A milk can punch including a disc-like frame having three guard members depending from the peripheral edge thereof and circumferentially spaced with respect to one another, a pair of said guard members lying in oppositely disposed relation to one another and portions of the said pair of oppositely disposed guard members being cut away therefrom and spaced inwardly with respect thereto and pointed to form punch members, the said punch members being cross sectionally V-shaped and pointed at their lowermost ends, the remaining guard member positioned midway between the said oppositely disposed pair of guard members.

CHARLES E. ENGLE.

REFERENCES CITED

The following references are of record in the file of this patent:

UNITED STATES PATENTS

| Number | Name | Date |
|---|---|---|
| 1,295,902 | Jordan | Mar. 4, 1919 |
| 1,434,881 | Exner | Nov. 7, 1922 |
| 1,471,601 | Hasty | Oct. 23, 1923 |
| 1,709,736 | Paterman | Apr. 16, 1929 |
| 2,049,116 | Harris | July 28, 1936 |
| 2,111,022 | Daily | Mar. 15, 1938 |